United States Patent [19]

Muller et al.

[11] Patent Number: 5,003,834
[45] Date of Patent: Apr. 2, 1991

[54] SERVO SYNCHRONIZATION WITH MECHANICAL INTER LOCK

[76] Inventors: Erich R. Muller, Hohe Strasse 15, D-7110 Ohringen-Cappel; Gunther Priwitzer, Hofgartenweg 20, D-7110 Ohringen; Felix Martin, Hermann-Hagenmeyer-Strasse 16, D-7113 Neuenstein, all of Fed. Rep. of Germany

[21] Appl. No.: 372,344

[22] PCT Filed: Sep. 21, 1988

[86] PCT No.: PCT/DE88/00585
  § 371 Date: Jul. 21, 1989
  § 102(e) Date: Jul. 21, 1989

[87] PCT Pub. No.: WO89/02995
  PCT Pub. Date: Apr. 6, 1989

[30] Foreign Application Priority Data
  Sep. 26, 1987 [DE] Fed. Rep. of Germany ....... 3732525

[51] Int. Cl.$^5$ .................... F16H 3/38; F16D 23/06
[52] U.S. Cl. ..................... 74/339; 192/53 F
[58] Field of Search ............ 74/339; 192/53 E, 53 F, 192/53 G

[56] References Cited

U.S. PATENT DOCUMENTS

| | | | |
|---|---|---|---|
| 3,414,098 | 12/1968 | Kelbel | 192/53 F |
| 3,700,083 | 10/1972 | Ashikawa et al. | 192/53 F |
| 3,741,358 | 6/1973 | Magnier | 192/53 F |
| 4,189,041 | 2/1980 | Muller | 192/53 F |
| 4,257,284 | 3/1981 | Ashauer et al. | 74/339 |
| 4,475,639 | 10/1984 | Tausend | 74/339 X |
| 4,641,734 | 2/1987 | Muller et al. | 192/53 F |
| 4,828,087 | 5/1989 | Kudo et al. | 74/339 X |
| 4,856,361 | 8/1989 | Shinmoto | 74/339 |

FOREIGN PATENT DOCUMENTS

| | | | |
|---|---|---|---|
| 184077 | 6/1986 | European Pat. Off. | 192/53 E |
| 2452768 | 8/1975 | Fed. Rep. of Germany | |
| 2250404 | 5/1975 | France | |

*Primary Examiner*—Dwight Diehl
*Attorney, Agent, or Firm*—Davis, Bujold & Streck

[57] ABSTRACT

A multi-range transmission for motor vehicles having a first gear and a second gear mounted side by side on a common shaft, and a synchronizing device, for matching the speed of the gears, located between the gears and movable axially relative thereto. An actuating element of the synchronizing device rotates with the first gear, the actuating element can be rotate with respect to the gearbox only through a limited angle of rotation and has a circumferential friction surface which can be brought into contact with an opposing friction surface of the second gear when axially moved. In order to permit synchronized shifting with a constant shift time, which is independent of the shift force applied manually, the actuator has a first inclined surface set at an angle to a radial plane which contacts a second inclined surface of with the first gear. In this way, when frictional engagement occurs, the actuating element is subject to an axial force which is directed toward the opposing friction surface of the second gear.

5 Claims, 3 Drawing Sheets

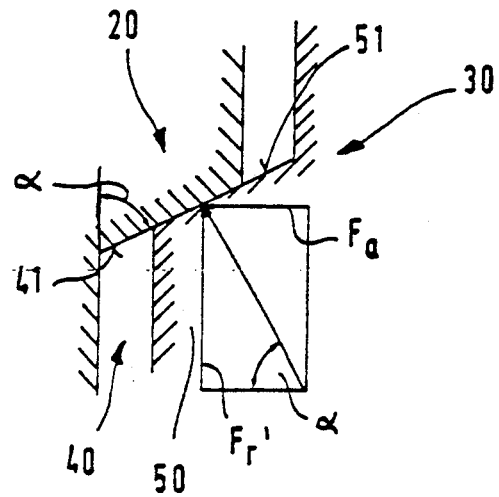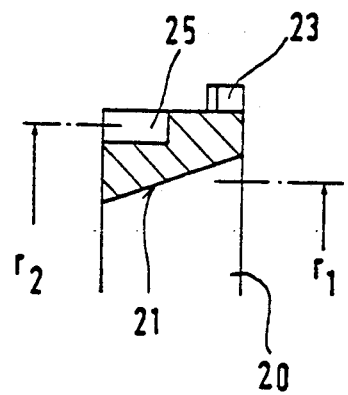
Fig.6          Fig.7
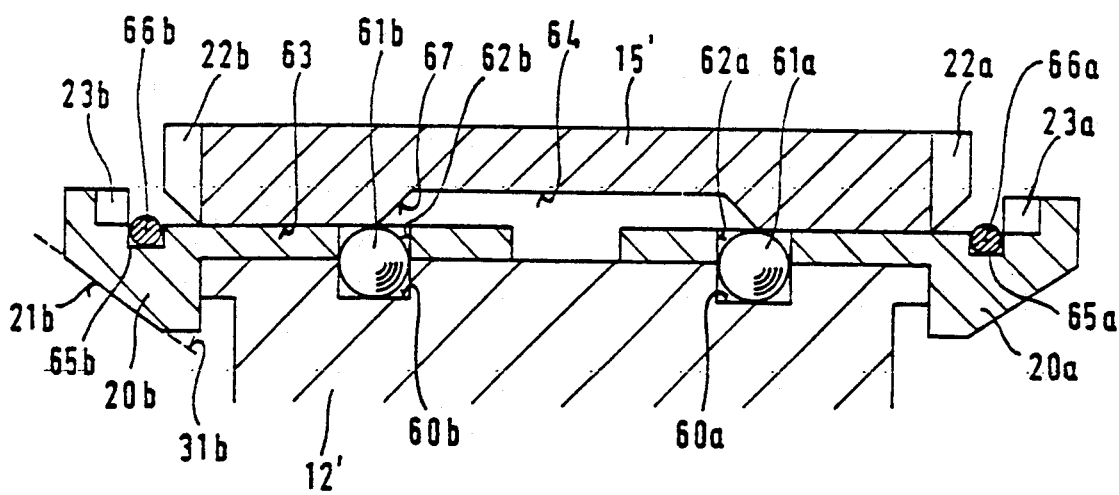
Fig.8

SERVO SYNCHRONIZATION WITH MECHANICAL INTER LOCK

The invention concerns a multi-range transmission for motor vehicles, with a first gear and a second gear located next to one another on a common shaft, with synchronizing devices located between the gears and movable axially with respect to them for matching the speed of the gears, whereby one actuating element of the synchronizing devices rotates with the first gear, however, rotable only within a limited portion of the circumference, and with a circumferential friction surface which can be brought into contact with an opposing friction surface of the second gear when moved axially.

Transmissions of the type described are generally known as synchromesh transmissions.

With customary transmissions of this type, the first gear rotates with the shaft, the second gear rotates freely on the shaft. The second gear meshes with a third gear which is located on and rotates with a second shaft which is parallel to the first one. The synchronizing devices are usually synchronizing rings which rotate with the first gear and can rotate within a limited angle of rotation with respect to the gear. A shift sleeve surrounding the external toothing of the gears can be made to slide by a shift fork, whereby the shift sleeve has internal toothing which positively engages in the external toothing of the first and second gear, thus connecting the gears so they rotate together.

Before this unirotating connection can be made, however, the shift sleeve slides the synchronizing ring—which usually has a conical friction surface—against the opposing surface of the second gear so that, if there is a difference in rotational speed between the first and second gear, a friction moment is induced which rotates the synchronizing ring by a stated finite angle of rotation with respect to the first gear. In this rotated state, the synchronizing ring prevents further axial movement of the shift sleeve so the respective shift range cannot be engaged until the first and second gears both rotate at the same speed. Only after this is the case—the friction moment has therefore reached zero—can the synchronizing ring rotate back to the initial, unrotated, position (for example, as a result of the force of a suitable return spring), clearing the axial path for the shift sleeve so the first and second gear can engage with each other, thus also engaging the desired shift range.

From the above description explaining the operation of customary synchromesh transmissions, it follows that the synchronizing procedure is highly dependent on how the vehicle drive executes the change of shift range by operating the shift lever; if the shift sleeve is moved relatively forcibly, thus thrusting the synchronizing ring with great force against the opposing surface of the second gear, a relatively large friction moment occurs immediately and the speed matching occurs relatively quickly. Conversely, the speed of the two gears is matched relatively slowly if the shift sleeve is moved with only a slight axial actuating force. This obviously influences the time required for the range change because the spreed gradient of the gear which is to be accelerated or slowed depends on the amount of the friction moment and directly influences the shift time.

The wear on the friction surfaces of the synchronizing ring and the opposing surface as well as the wear on the toothing also naturally depend on the force with which the shift sleeve is moved axially.

The objective of the invention is to further develop a transmission of the type described so that the synchronizing procedure takes place independently of the shift force applied by the driver.

This objective is implemented by the invention as follows: the actuator has a first surface which is slanted from the radial plane; it meets with an opposing, second, inclined surface which rotates with the first gear in such a manner that an axial force is applied by the actuator against the opposing friction surface when friction occurs.

The invention completely fulfills this objective in the manner stated above. When the driver wishes to shift the transmission range, he need only initiate the synchronizing procedure by bringing the friction surfaces into contact with one another because the resulting friction moment immediately causes axial displacement of the actuator by means of the invention's wedge system; the axial displacement then increases the friction moment in a specified manner. By adjusting the geometry of the inclined surfaces and the friction surfaces and selecting the friction coefficient, development of a friction moment within a pre-determined time frame results automatically, thus ensuring a synchronizing procedure which always occurs uniformly.

This provides the additional advantage that a constant shift time can be specified and wear can also be held constant, enabling the service life of the components to be precisely calculated. Lastly, the invention also has the advantage that it provides a considerable contribution toward automatation of multi-range transmissions with spur-gear toothing and interruption of tractive force because the self-regulation of the synchronizing procedure as described above requires only to be triggered for initiation, which can be achieved easily with a simple mechanical transducer or similar initiator together with an electronic control unit.

It has already been mentioned above that the invention is particularly suitable for use in conventional multi-range transmissions characterized by having a first gear which rotates with the shaft; that a second gear rotates on the same shaft, engaging an additional third gear which rotates with a shaft located parallel to the first shaft; that the first gear rotates with a synchronizing ring; that a first friction surface on the synchronizing ring works together with an opposing friction surface on the second gear; that a sliding shift sleeve surrounds the first and second gear.

An advantage of these measures is that the invention can be integrated easily into existing transmissions because only relatively minor modifications to the synchronizing ring and the gears and shift sleeve are necessary.

Based on the invention, the inclined surfaces can alternatively be either on the first gear and on the synchronizing ring, or on the shift sleeve and on the synchronizing ring, depending on which is more practical with the space avabilable.

With a further design variant of the invention, the synchronizing rings are located on both sides of the first gear and blocking devices are provided to axially arrest one synchronizing ring when the other synchronizing ring is moved.

Thus, the advantages of the invention are retained in the otherwise customary system of locating two synchronizing rings on either side of a gear, with a shift sleeve which can be moved in both directions relative to the gear. Because of the self-regulating synchronizing procedure with automatically increasing friction moment, care must be taken to ensure that none of the friction surfaces even momentarily, thus causing undesired synchronization in the transmission. The characteristics memtioned above eliminate the problem because the blocking devices reliably prevent unintentional axial movement of the synchronizing rings.

One implemented form of this variant uses a ball obstructor as blocking device; a ball is located in an opening of the synchronizing ring, whereby the ball diameter is larger than the radial thickness of the synchronizing ring in the area of the aperture; furthermore, the ball also either engages only in a radial cavity of the first gear, or only in a radial cavity of the shift sleeve.

This is an advantage in that a blocking device is available which works with low friction while ensuring the blocking function in every operating state.

Additional examples of versions of the invention are synchronizing rings equipped with a resilient ring which the shift sleeve contacts in order to engage the friction surface of one of the synchronizing rings with the opposing surface.

This measure has the advantage that a pre-synchronization occurs because contact of the shift sleeve with the resilient ring increases the friction moment between the two components beyond that provided by the slight, limited angle of rotation already mentioned.

In conclusion, there is another version of the invention in which the shift sleeve and the synchronizing ring are each equipped with blocking devices; when the shift sleeve and the synchronizing ring rotate with respect to each other, the blocking devices overlap each other partially and prevent axial motion of the shift sleeve beyond a predetermined position, as is generally known.

Additional advantages can be found in the description and the accompanying drawings.

It is obvious that the characteristics already mentioned and those which are to follow are applicable not only in the combinations stated, but also in other combinations or also alone, without departing from the scope of this invention.

Examples of the invention are illustrated in the drawings and will be explained in more detail in the following description.

FIG. 6 is a schematic sketch to explain the resulting forces affecting the inclined surfaces.

FIG. 7 is an additional schematic sketch to explain the resulting friction moments.

FIG. 8 shows part of a cross-sectional representation for explanation of the blocking devices of synchronizing rings as in the invention.

Figure 1:
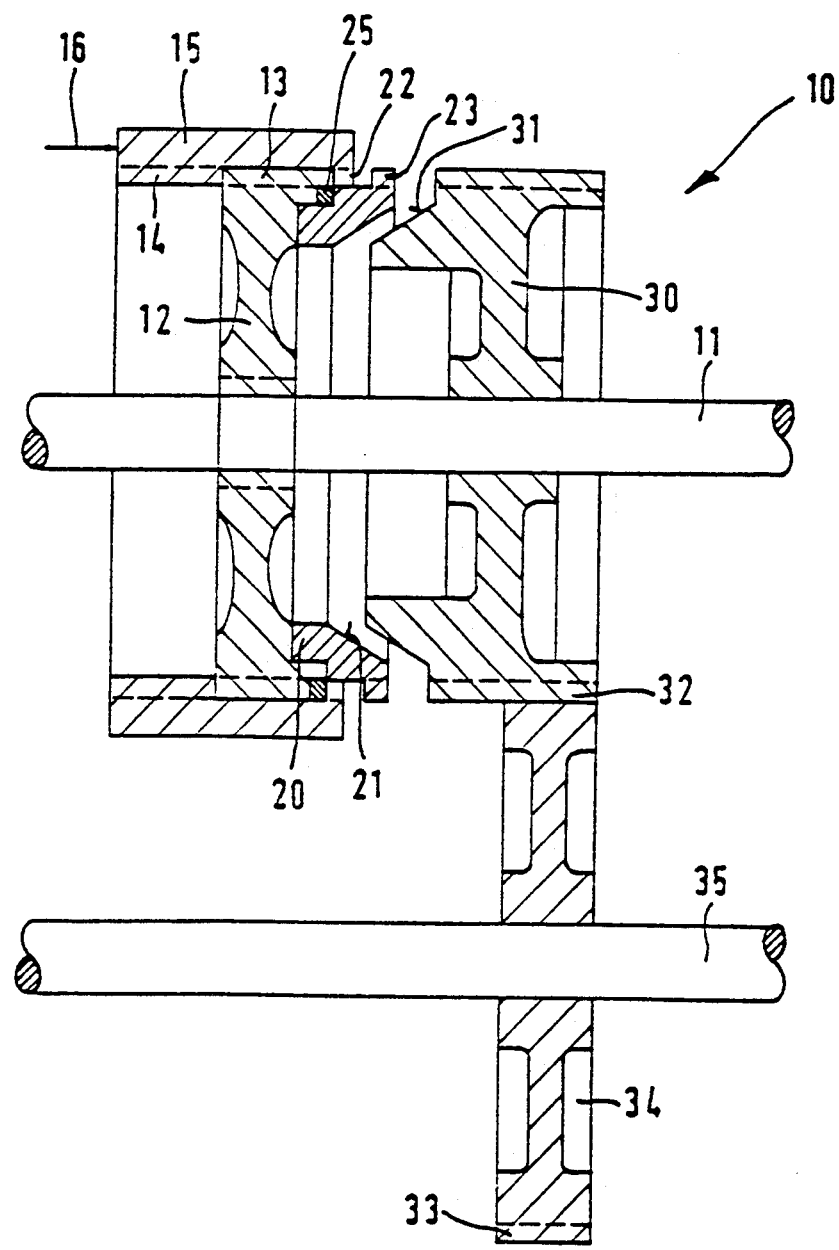
FIG. 1 shows a highly schematic side view—partially in section—of part of a spur-geared, multi-range transmission as related to the invention.

In FIG. 1, (10) in a spur-toothed, synchromesh, multi-range, motorvehicle transmission. On the first shaft (11), a first gear (12) is located; it cannot move axially and rotates with the shaft; the external toothing (13) of the gear (12) engages the internal toothing (14) of a shift sleeve (15) which can be moved axially as indicated by the arrow (6).

A synchronizing ring (20) is located axially next to the first gear (12); the ring (20) rotates with the first gear (12) and can be rotated by a certain angle of rotation with respect to the gear (12). The synchronizing ring (20) has a conical friction surface (21) on the side facing away from gear (12).

The shift sleeve (15) and the synchronizing ring (20) have blocking devices (22 and 23) respectively; these have the form of a type of toothing and prevent axial movement of the shift sleeve (15) beyond the right face of the synchronizing ring (20) in FIG. 1 when the synchronizing ring (20) is rotated with respect to the first gear (12). When (20) and (12) are not rotated to one another, they are in a alignment and do not block axial travel of the shift sleeve (15).

As in later explained in detail, inclined surfaces are provided on the circumference of the first gear (12) and on the synchronizing ring (20); these surfaces are inclined from a radial plane of shaft (11) and engage one another. They form the circumferential wedge system which is only suggested by (25) of FIG. 1. A second gear (30) can rotate freely but is axially located on the first shaft (11), to the right of the synchronizing ring (20) of FIG. 1; (30) has an opposing surface (31), which also has a conical shape which runs parallel to the friction surface (21). There is an axial clearance between the opposing surface (31) and the friction surface (21), however this clearance is shown exaggerated in FIG. 1 for the sake of clarity.

The second gear (30) has external toothing (32) which meshes with external toothing (33) of a third gear (34) which is located axially on and rotates with a second shaft (35) which is parallel to the first shaft (11).

When the range is to be changed with the driving moment to be transmitted from the first shaft (11) through the ratio of gears (30/34) to the second shaft (35), the following occurs:

In the operation position shown in FIG. 1, the first driven gear (12) rotates with the first shaft (11); the shift sleeve (15) and synchronizing ring (20) rotate with it. Because of the clearance between the friction surfaces (21/31), the first shaft (11) is not loaded.

To effect a range change, the shift sleeve (15) is moved in the direction of the arrow (16), taking the synchronizing ring (20) with it axially. When the friction surface (21) of the synchronizing ring meets the opposing surface (31) of the second gear (30), the difference in speed between gears (12) and (30) causes a friction moment. This friction moment rotates the synchronizing ring (20) with respect to the first gear (12.) The blocking devices (22, 23) prevent the shift sleeve (15) from being moved further axially from this moment on so the only transmission of power between the first gear (12) and the second gear (30) takes place in the friction contact of the friction surfaces (21/31). As a result of this friction contact, the speed of the two gears (12, 30) become matched until, when the speed difference reaches zero, the friction moment also reaches zero and the blocking elements (22, 23) now align with one another and no longer prevent axial movement of the shift sleeve (15). The shift sleeve (15) can now be moved far enough to the right that its internal toothing (14) can engage the external toothing (32) of the second gear (30) in its left half. Gears (12) and (30) are now coupled and rotate together so that transmission of torque from the first shaft (11) to the second shaft (35) now occurs through gears (30/34).

In order to control the synchronizing procedure described above automatically by engaging the friction surfaces (21/31), the circumferential wedge system (25) is provided; FIGS. 2 through 7 are referred to in the following to explain the system.

Figure 2:
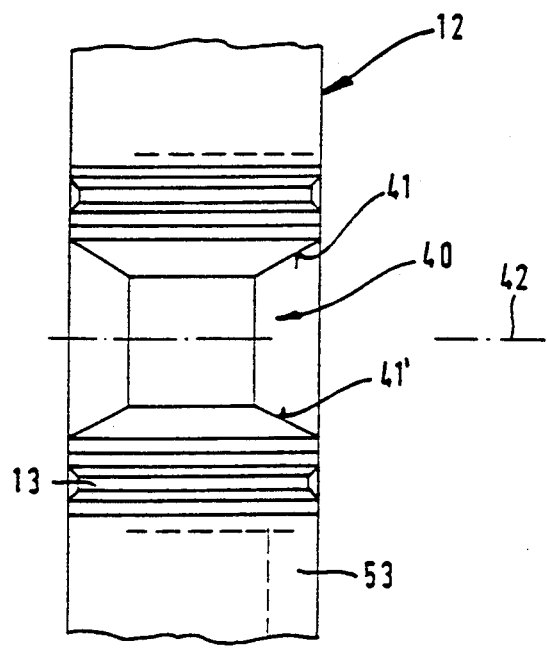
FIG. 2 shows a radial view of part of a gear with the inclined surfaces as in the invention.

From the greatly enlarged radial side view in FIG. 2, one can see that the first gear (12) has one (or more) trapezoidal-shaped apertures on the circumference, which are limited in the circumferential direction by the first peripheral inclined surfaces (41 and 41'). The aperture (40) runs symmetrically to a centerline (42) which runs parallel to the first shaft (11).

Figure 3:
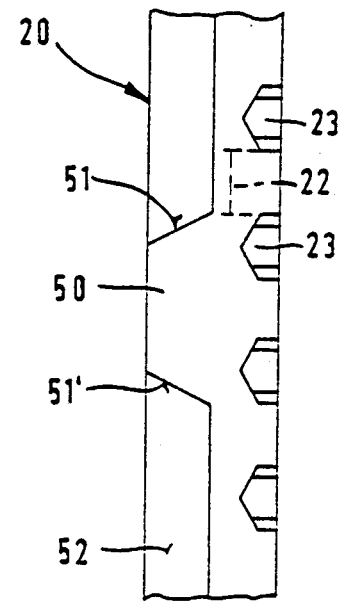
FIG. 3 shows a radial view of part of a synchronizing ring as works in the invention with the gear of FIG. 2.

FIG. 3 shows the related part of the synchronizing ring (20) which has a projection (50) complementing the aperture (40). The projection (50) has second peripheral inclined surfaces (51 and 51').

The first gear (12) and the synchronizing ring (20) partially cover each other axially when they are in the neutral or in a synchronized operating positions; for this reason, the outside diameter (52) of the external first contact surface of synchronizing ring (20) is slightly reduced, while the first gear (12) has a corresponding inner second contact surface (53).

Figure 4:
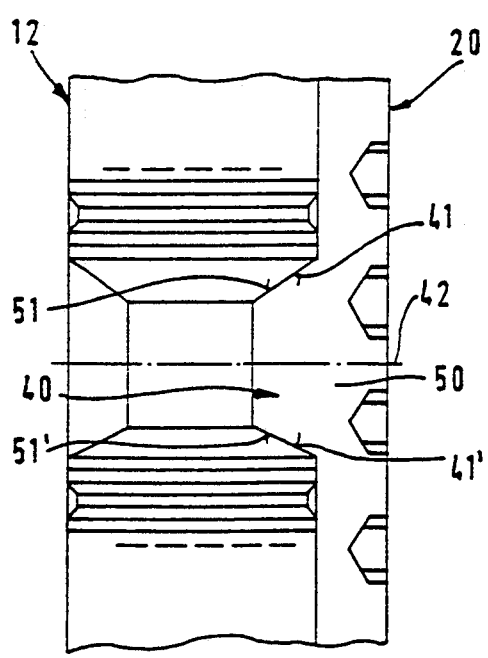
FIG. 4 shows the gear of FIG. 2 and the synchronizing ring of FIG. 3 in the synchronized position.

FIG. 4 shows the state mentioned above in neutral or synchronized operation; the projection (50) mates with the aperture (40), the related inclined surfaces (41/51) and (41'/51') contact one another. As seen from the circumference, there is symmetry with respect to the common centerline (42).

Figure 5:
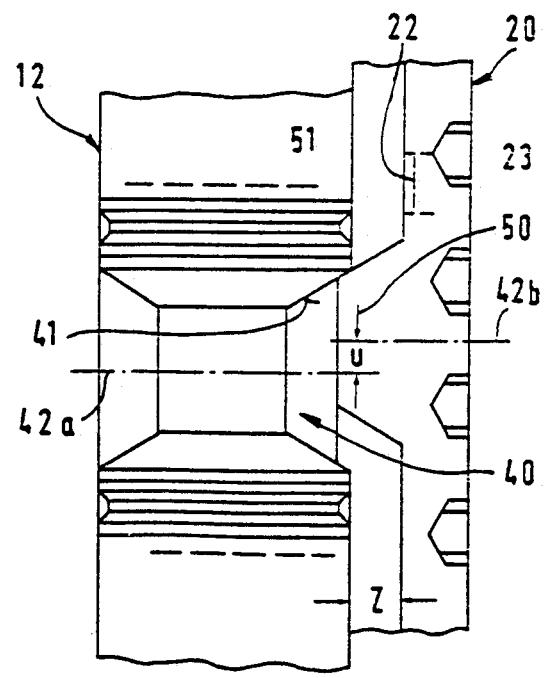
FIG. 5 is an illustration similar to FIG. 4, however, in the unsynchronized position.

If now, however, the friction surface (21) reaches the opposing surface (31)-compare with FIG. 1-the resulting friction moment of the synchronizing ring (20) will be rotated with respect to the first gear (12). FIG. 5 shows such an operating state; the rotation (viewed from the right in FIG. 5) occurs in such a manner that the synchronizing ring (20) rotates counterclockwise from the first gear (12). The first inclined surface (41) of the first gear (12) now slides toward the related second inclined surface (51) of synchronizing ring (20), which—when rotated relative to the gear by the circumferential portion (u)—leads to an axial displacement (z) of the synchronizing ring (20) with respect to the axially fixed first gear (12). In this case, centerlines (42a and 42b) are offset to one another on the circumference by the stated circumferential portion (u).

By comparing FIGS. 3 and 5, one can also recognize the function of the blocking elements (22 and 23). In the synchronized position (FIG. 3), blocking elements (22 and 23) can mesh, so they do not prevent axial movement of the shift sleeve (15). In the non-synchronized, rotated position as in FIG. 5, the blocking elements (22 and 23) overlap each other partially so that further movement of the shift sleeve (15) is not possible beyond a pre-determined axial position. In this way, unsynchronized mis-shifting is prevented because the inner toothing (14) of the shift sleeve (15) cannot be made to mesh with the outer toothing (32) of the second gear (30).

FIGS. 6 and 7 illustrate the forces which occur at the wedge system (25).

In FIG. 6, one can recognize that the axial force $(F_a)$ takes effect at the synchronizing ring (30); this is related to the radial force $(F_r')$ taking effect at the inclined surfaces (41/51) as follows:

$$F_a = \frac{F_r'}{tg\, \alpha}$$

with $\alpha$ being the angle of the inclined surfaces (41 and 51) with respect to a radial plane in FIG. 6.

If one further considers that the forces (F) are applied to the conical friction surface (21) with a radius $(r_1)$ and to the wedge system (25) with a radius $(r_2)$—each with reference to the axis of the first gear (12) and the synchronizing ring (30), the equation above can be written as follows:

$$F_a = \left(\frac{F_r}{tg\, \alpha}\right)\left(\frac{r_1}{r_2}\right)$$

with $F_r$ being the radial force affecting the friction surface (21). The axial force $f_a$ induced by the wedge system (25) in turn induces a friction force $$F_a = \frac{F_a'\, \mu}{\sin \beta}$$

with $\beta$ being the cone angle of the friction surface (21). The initial axial force $(F_a)$ thus results—by way of the friction surface (21) and the wedge system (25)—in a subsequent axial force $(F_A)$ which follows the following equation:

$$F_A = F_a\left(\frac{\beta}{\sin \beta\, tg\, \alpha}\right)\left(\frac{r_1}{r_2}\right) = F_a K$$

By selecting a suitable friction coefficient $(\mu)$ for friction surface (21), the angles $(\alpha)$ and $(\beta)$ as well as the radii $(r_1)$ and $(r_2)$, a constant can be achieved which is greater than 1. In this case, a self-amplification—or coupling—of the friction moment occurs which rises to a maximum value in a controlled manner until the first gear (12), the synchronizing ring (20) and the second gear (30) run synchronously.

FIG. 8 shows a detail of another version in which synchronizing rings (20a 20b) are located on each side of the first gear (12'). To prevent uncontrolled synchronizations from occurring if one of the synchronizing rings (20a or 20b) unintentionally comes into contact with the related gear, a mutual interlock is provided.

The interlock is a ball obstructor which comprises radial cavities (60a, 60b) in the first gear (12'); balls (61a, 61b); apertures (62a, 62b) in the synchronizing rings (20a, 20b); as well as a common radial cavity (64) in the shift sleeve (15').

As one can clearly see in FIG. 8, the diameter of the balls (61a, 61b) is larger than the radial thickness of the synchronizing rings (20a, 20b in the area of the apertures (62a, 62b). In the neutral position illustrated in FIG. 8, upward travel of balls (61a, 61b) through an inner surface (63) is blocked by the shift sleeve (15') so the balls (61a, 61b) also partially engage in the radial cavities (60a, 60b) of the first gear (12') and thus block both synchronizing rings (20a, 20b) axially.

If now, for example, the shift sleeve (15') in FIG. 8 is moved to the left, nothing is changed for the right ball (61a) because it is still held in the aperture (62a) by the inner surface (63) as well as by the radial cavity (60a). The left ball (61b), however, can move into the radial cavity (64) of the shift sleeve (15′), clearing the interlock of the shift sleeve (20b), allowing it to move to the left. This takes place as follows: the shift sleeve (15′) moves up to the resilient ring (66b) which is in a groove (65b) of the synchronizing ring (20b). The synchronizing ring (20b) is now moved to the left; its friction surface (21b) meets the related opposing surface (31b), at which point the synchronizing procedure described in detail above takes place. When leaving this transmission range, a lateral limiting flank of the cavity (64) takes the ball (61b) with it and, thus, also the synchronizing ring (20b) until the ball (61b) falls back into the radial cavity (60b), again releasing the synchronizing ring (20b).

It is obvious that numerous variations are possible within the scope of this invention, especially ones which relate to kinematic reversals of the mechanism mentioned above.

As one example, the synchronizing ring could rotate with the second gear (30) and the first gear (12) could be provided with an opposing friction surface. Allowing the wedge system to operate between the shift sleeve and the synchronizing ring instead of between the first gear and the synchronizing ring is also conceivable. Additionally, it is possible to divide the functions of the synchronizing ring into an actuating element and a friction element, whereby the actuating element rotates with one gear and is rotable and axially movable by the wedge system with respect to the gear, while the friction element is a "floating" synchronizing ring located between two opposing surfaces, one each on the actuating element and on the opposing gear.

I claim:

1. A multi-range transmission, for motor vehicles, with a first gear and a second gear located next to one another on a first shaft and synchronizing means located between the first and second gears and movable axially with respect thereto for synchronizing the speed for the two gears, whereby a synchronizing ring of the synchronizing means, which rotates with the first gear, is rotatable only a limited portion with respect to the first gear and has a circumferential friction surface which, when actuating element is moved axially, can be brought with an opposing friction surface of the second gear, the synchronizing ring has an inclined surface, inclined with respect to a radial plane which contacts an inclined surface of the first gear so that when frictional engagement between the two friction surfaces occurs and axial force directed toward the opposing friction surface is applied to the synchronizing ring, the first gear rotates with and the second gear rotates on the first shaft, the second gear engages a third gear which rotates with a second shaft aligned parallel to the first shaft, and a shift sleeve is movable over the first and second gears to lock the two gears together, wherein a synchronizing ring is provided on each side of the first gear, and blocking means is provided to prevent axial movement of one of the synchronizing rings when the other synchronizing ring is moved.

2. A multi-range transmission as in claim 1, wherein the blocking means comprises obstructor balls, at least one ball is partially located in an aperture of each synchronizing ring, the diameter of the ball is larger than the radial thickness of the synchronizing ring in the area of the aperture whereby the ball can engage one of a radial cavity of the first gear and a radial cavity of the shift sleeve.

3. A multi-range transmission as in claim 1, wherein each synchronizing ring is provided with a resilient ring which the shift sleeve contacts in order to bring the friction surface of that synchronizing ring into contact with its adjacent opposing friction surface.

4. A multi-range transmission as in claim 1, wherein the shift sleeve and the synchronizing ring are each provided with blocking elements which at least partially overlap one another and only allow axial movement of the shift sleeve beyond a predetermined position when the blocking elements are in meshing engagement.

5. A multi-range transmission, for motor vehicles, with a first gear and a second gear located next to one another on a first shaft and synchronizing means located between the first and second gears and movable axially with respect thereto for synchronizing the speed of the two gears, whereby a synchronizing ring of the synchronizing means, which rotates with the first gear, is rotatable only a limited portion with respect to the first gear and has a circumferential friction surface which, when actuating element is moved axially, can be brought into contact with an opposing friction surface of the second gear, the synchronizing ring has an inclined surface, inclined with respect to a radial plane, which contacts an inclined surface of the shift sleeve so that when frictional engagement between the two friction surfaces occurs an axial force directed toward the opposing friction surface is applied to the synchronizing ring, the first gear rotates with and the second gear rotates on the first shaft, the second gear engages a third gear which rotates with a second shaft aligned parallel to the first shaft, and a shift sleeve is movable over the first and second gears to lock the two gears together, wherein a synchronizing ring is provided on each side of the first gear, and blocking means is provided to prevent axial movement of one of the synchronizing rings when the other synchronizing ring is moved.

* * * * *

UNITED STATES PATENT AND TRADEMARK OFFICE
CERTIFICATE OF CORRECTION

PATENT NO.    : 5,003,834

DATED         : April 2, 1991

INVENTOR(S)   : Erich Richard MULLER, Gunther PRIWITZER & Felix MARTIN

It is certified that error appears in the above-identified patent and that said Letters Patent is hereby corrected as shown below:

Column 7, line 37 replace "for" (second occurrence) with "of";
          line 43 after "brought" insert --into contact--;

line 45 after "plane" insert --,--;

line 48 delete "and" and insert --an--.

Column 8, line 38 after "gear" delete ","; and

Signed and Sealed this

Twelfth Day of October, 1993

Attest:

BRUCE LEHMAN

*Attesting Officer*     *Commissioner of Patents and Trademarks*